J. L. PERKINS.

CALENDERING ROLL.

APPLICATION FILED MAR. 8, 1910.

Reissued July 5, 1910. 13,128.

Witnesses
J. D. Long
G. R. Driscoll

Inventor
John Lewis Perkins
by W. H. Bellows
Attorney

UNITED STATES PATENT OFFICE.

JOHN LEWIS PERKINS, OF HOLYOKE, MASSACHUSETTS.

CALENDERING-ROLL.

13,128. Specification of Reissued Letters Patent. Reissued July 5, 1910.

Original No. 861,888, dated July 30, 1907, Serial No. 350,465. Application for reissue filed March 8, 1910. Serial No. 548,101.

DIVISION B.

*To all whom it may concern:*

Be it known that I, JOHN LEWIS PERKINS, a citizen of the United States of America, and a resident of Holyoke, in the county of Hampden and State of Massachusetts, have invented certain new and useful Improvements in Calendering-Rolls, of which the following is a full, clear, and exact description, the present case being an application for a divisional reissue of Letters Patent 861,888, granted July 30, 1907, of which I am now sole owner, the other application being filed of even date with this case and bearing Serial Number 548,100.

This invention consists in a calendering roll constructed substantially as illustrated in the accompanying drawings, and as set forth in the description hereinafter given and pointed out in the claim, for results and advantages hereinafter described and explained.

Figure 1:
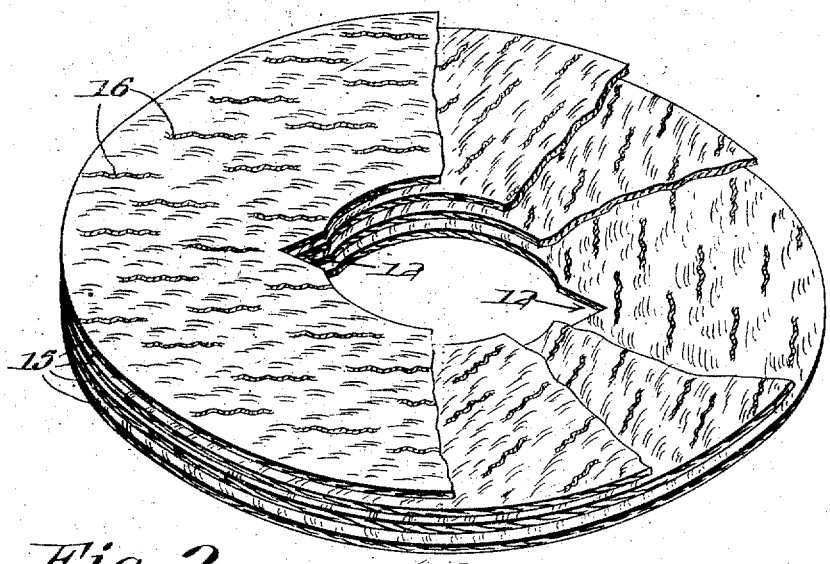
Figure 2:
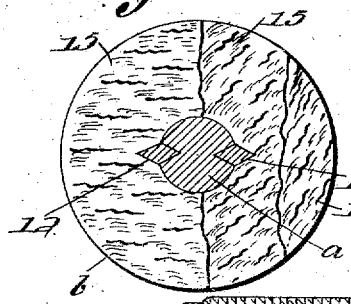
Figure 3:
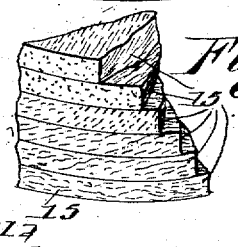
Figure 4:
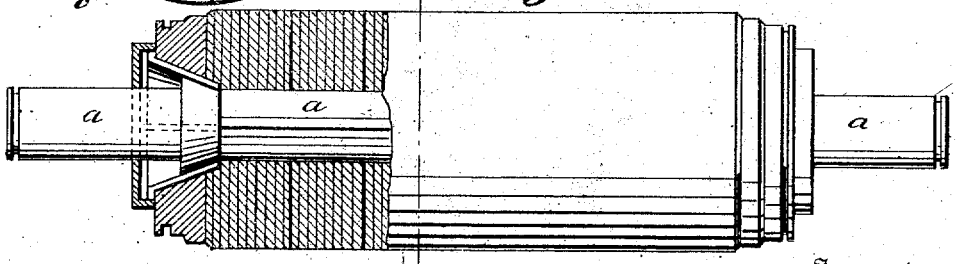

In the drawings,—Figure 1 is a perspective view of a portion of an annular block or "cheese", a considerable number of which, in compressed form, constitute the body of the roll. Fig. 2 is a cross sectional view as taken on line 2--2, of the complete roll shown in Fig. 4, portions of thin layers of the carded cotton being broken away to show the relative arrangement of the fibers of the adjacent layers. Fig. 3 is a perspective view, on an enlarged scale, of a portion of one of the annular blocks or cheeses for making additionally clear the relative arrangement of the fibers of the successive layers. Fig. 4 is a side elevation of the complete calendering roll with one end portion thereof shown in central longitudinal section.

The roll consists of a central shaft or arbor *a* and an encircling body *b* of cotton having the majority of the fibers thereof substantially radially disposed, said body of cotton being, by a hydraulic ram exerting hundreds of tons pressure, compressed to hard condition, the roll being made or finished with a smooth periphery of uniform character throughout, and susceptible of having the same uniform character, when refinished or turned from time to time after protracted use, it being particularly emphasized that the majority of the fibers of the cotton are throughout the entire body of the roll in endwise presentation to the periphery,—said calendering roll, furthermore, being provided with metallic end heads between which the body of the roll is confined in its hard compression.

In carrying out this invention in the most practicable and expeditious manner, I build up annular blocks or cheeses 10, 10, of layers of cotton felt carded with the fibers thereof arranged in parallelism, placing one layer with the lengths of the fibers at a very slight angle, say of 22½ degrees, to those of the next, and so on successively, so that, for instance, every sixteenth one of the layers will have its fibers arranged parallel with those of the assumed first lower layer, and the annular block or cheese so built up, say to a height of three to six inches, and having spline cuts 12 in opposition at the boundary of the central opening therein, is fitted about the roll shaft *a* to which one of the end heads *c* is secured, and this with several other of the so produced cheeses are subjected for a suitably longer time to an extremely high hydraulic pressure until the portion of the body of the roll constituted by a given number of cheeses is compressed to a suitably solid and hard condition. It will thus be seen that a comparatively large number of the layers is required to make a "cycle", the number being governed by the angle between the fibers of the respective layers.

Additional numbers of the annular blocks or cheeses are then added on the roll shaft and subjected to the squeezing action in the hydraulic press until the roll body of sufficient length is completed, whereupon the other end head is applied and secured in an already well known manner.

In all of the figures of the drawings, 15, 15 represent the different superimposed layers of the cotton felt carded with the fibers thereof in parallel arrangement.

As well known, a calendering machine usually comprises a stack of calendering rolls, a number of which are metallic rolls, while other and relatively intermediate rolls are those having a non-metallic body.

The character or quality of the resistance of the body of the non-metallic roll is of the utmost importance for surfacing or finishing paper and cloth.

In some cases rolls having paper bodies are adapted for a given required quality of finish, while in many other cases alternated calender rolls having hard compressed cotton bodies may only be employed, and a cotton body roll has acquired an established status in the art of calendering. Cotton body rolls have however, so far as produced for commercial purposes, usually been made from #17 cotton with the fibers thereof promiscuously arranged, and a roll so made is one which lacks in a most material degree the wearing qualities and satisfactory surfacing capabilities which the present roll possesses. And notwithstanding that after long use of one of the calender rolls of the present fabrication it may become worn and somewhat untrue, and require to be newly returned and refinished, the so refinished roll will be as effective and satisfactory as it was in its initial condition of completed manufacture.

It has been proposed to construct a roll made up of layers or comparatively thin bodies of cotton, each layer consisting of a plurality of films or sheets of carded cotton, the fibers of each sheet being parallel, and each sheet relatively to the next being arranged with its fibers at substantially right angles to those of the next, but such a roll, so far as known, has never been commercially produced, and such roll could not possess the quality of having the majority of the fibers thereof in a substantially radial disposition, for while half of the fibers will be radial to opposite peripheral portions of the roll body, the remaining half of the fibers will be in sidewise instead of endwise presentation to the same given opposite peripheral portions of the roll, and there can be no practical uniformity and homogeneity in character of the roll body both at its surface and inside thereof, as are the aim and accomplishments of this invention.

I furthermore find it advantageous to employ cotton strands 16 which may be twisted threads or slivers, or rovings, incorporated with the carded fibers making up the superposed layers, such serving as binders and reinforcement in the roll body.

I claim:

A paper calendering roll including a shaft, and an encircling body composed of a plurality of layers of cotton felt, the fibers of each layer being arranged in parallelism and those of each layer being at a slight angle to those of each preceding layer, whereby a comparatively large number of the layers is required to make a "cycle."

JOHN LEWIS PERKINS.

Witnesses:
FRED P. CLEVELAND,
WM. H. BOND.